US007051866B2

(12) United States Patent
Irish (10) Patent No.: US 7,051,866 B2
(45) Date of Patent: May 30, 2006

(54) CAFETERIA TRAY ACCUMULATOR

(76) Inventor: Douglas W. Irish, 1816 Fairway Dr., Uniontown, OH (US) 44685

( * ) Notice: Subject to any disclaimer, the term of this patent is extended or adjusted under 35 U.S.C. 154(b) by 0 days.

(21) Appl. No.: 10/662,562

(22) Filed: Sep. 12, 2003

(65) Prior Publication Data

US 2004/0089518 A1    May 13, 2004

Related U.S. Application Data (60) Provisional application No. 60/424,889, filed on Nov. 8, 2002.

(51) Int. Cl.
*B65G 17/32*    (2006.01)
(52) U.S. Cl. .............. 198/681; 198/465.4; 198/678.1; 198/817
(58) Field of Classification Search ............ 198/465.4, 198/465.3, 435, 485.1, 678.1, 681, 817, 821, 198/845, 838; 211/121, 122
See application file for complete search history.

(56) References Cited

U.S. PATENT DOCUMENTS

| | | | | |
|---|---|---|---|---|
| 1,787,731 A | * | 1/1931 | Krenzke ...................... 198/681 |
| 1,837,605 A | * | 12/1931 | Baker ....................... 198/465.3 |
| 2,872,057 A | | 2/1959 | Wagner et al. |
| 3,023,878 A | * | 3/1962 | Forsthoff et al. ........... 198/354 |
| 3,655,031 A | | 4/1972 | Cahn |
| 3,727,745 A | * | 4/1973 | Richterkessing ............ 198/687 |
| 3,840,103 A | * | 10/1974 | Willis ......................... 194/210 |
| 3,857,476 A | | 12/1974 | Heifetz et al. |
| 3,999,630 A | * | 12/1976 | McPhee ......................... 186/40 |
| 4,274,886 A | * | 6/1981 | Noren ......................... 134/25.2 |
| 4,303,503 A | * | 12/1981 | de Mimerand et al. ...... 209/3.3 |
| 4,311,211 A | | 1/1982 | Benjamin et al. |
| 4,349,714 A | * | 9/1982 | Tamano ....................... 219/700 |
| 4,479,572 A | | 10/1984 | Merz |
| 4,640,196 A | * | 2/1987 | Dehne .......................... 104/94 |
| 4,676,365 A | * | 6/1987 | Noren .................... 198/803.14 |
| 4,722,433 A | * | 2/1988 | Gough ......................... 198/706 |
| 4,917,369 A | * | 4/1990 | Moll et al. ................... 271/228 |
| 4,957,188 A | | 9/1990 | Bavis |
| 4,966,672 A | * | 10/1990 | Levit et al. .................. 204/198 |
| 5,088,589 A | * | 2/1992 | Geerts .................... 198/457.05 |
| 5,113,970 A | | 5/1992 | Bavis |
| 5,115,907 A | | 5/1992 | Pomara, Jr. |
| 5,119,939 A | * | 6/1992 | Teeter et al. ............. 198/860.2 |
| 5,220,989 A | * | 6/1993 | Smith ....................... 198/347.4 |
| 5,226,525 A | * | 7/1993 | Dooley ........................ 198/680 |
| 5,464,032 A | | 11/1995 | Litterst |
| 6,152,154 A | * | 11/2000 | Elgharini ...................... 134/71 |
| 6,267,124 B1 | * | 7/2001 | Bowden ........................ 134/71 |

* cited by examiner

*Primary Examiner*—Douglas Hess
(74) *Attorney, Agent, or Firm*—Renner, Kenner, Greive, Bobak, Taylor & Weber (57) ABSTRACT

A cafeteria tray accumulator includes a plurality of tray holding cages that are suspended from a drive track that moves in a loop with one transverse leg disposed above another transverse leg. Each tray-holding cage includes a plurality of shelves that hold cafeteria trays on above the other. A counterbalance mechanism is used to prevent the cages from swaying back and forth. The counterbalance mechanism may be an offset rail or a wheel carried by the cage that engages a support structure. The accumulator has increased tray capacity because of the multiple tray-holding cages and the two transverse legs of the drive path.

15 Claims, 10 Drawing Sheets

CAFETERIA TRAY ACCUMULATOR

CROSS-REFERENCE TO RELATED APPLICATIONS

This application claims priority from U.S. provisional patent application Ser. No. 60/424,889 filed Nov. 8, 2002; the disclosures of which are incorporated herein by reference.

BACKGROUND OF THE INVENTION

1. Technical Field

The present invention generally relates to cafeteria tray accumulators. More particularly, the present invention relates a cafeteria tray accumulator that increases tray accumulation capacity by doubling back over or under itself. Specifically, the invention relates to a cafeteria tray accumulator that includes a plurality of hanging cages that are each adapted to hold a plurality of trays laden with dishes. The invention may be retrofit into existing tray accumulator wall layouts.

2. Background Information

Several cafeteria tray accumulators are known in the art. A typical arrangement places a horizontal belt or roller conveyor between two boundary walls that run in the longitudinal direction of the conveyor. A typically interior dimension between the longitudinal boundary walls is 20 inches. A loading window provides access to the conveyor where patrons drop off their trays and dirty dishes. A second window is provided at the dish washing area. The second window may be disposed on either side of the conveyor as dictated by the location of the dining room and the dish room.

A problem with these types of conveyors is overloading. Overloading typically occurs when a large group of patrons use the dining room when the dish room is under-staffed. When this situation occurs, the horizontal conveyor fills with trays and dishes. A limit switch typically stops the conveyor from running when it is filled. Once the conveyor stops running, the patrons pile their trays and dishes on the conveyor at the loading window. If the dish staff does not recognize the problem, they will start unloading the dishroom end of the conveyor upsetting the dishes at the loading window causing them to crash to the floor and creating a slip-and-fall hazard as well as janitorial work.

One solution to this problem is to maintain an adequate dish room staff at all times in order to keep the conveyor clear and running. As dish room labor becomes increasingly expensive and difficult to hire, this problem becomes increasingly unsatisfactory to those who operate cafeterias. Another solution to the overloading problem is to increase the length of the conveyor or to provide a second conveyor. The drawbacks to these solutions is cost and space. In view of the foregoing, cafeteria owners and designers desire a tray accumulator with increased tray capacity.

BRIEF SUMMARY OF THE INVENTION

In one embodiment, the invention provides a tray accumulator having a plurality of tray holding cages that are suspended from a drive track that moves in a loop with one transverse leg disposed above another transverse leg. Each tray holding cage holds a plurality of trays.

Another embodiment of the invention provides a tray accumulator that suspends tray-holding cages from a support bar that is attached to a drive track. The support bar is also received in a counterbalance rail so that the support bars do not pivot with respect to drive track. The drive track and counterbalance rail may be disposed in different locations with respect to the tray-holding cages.

A different aspect of the invention relates to the manner in which the system is assembled. This embodiment of the invention provides the drive and counterbalance rails in sections that may be quickly and easily bolted together to provide for quick drive track assembly.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
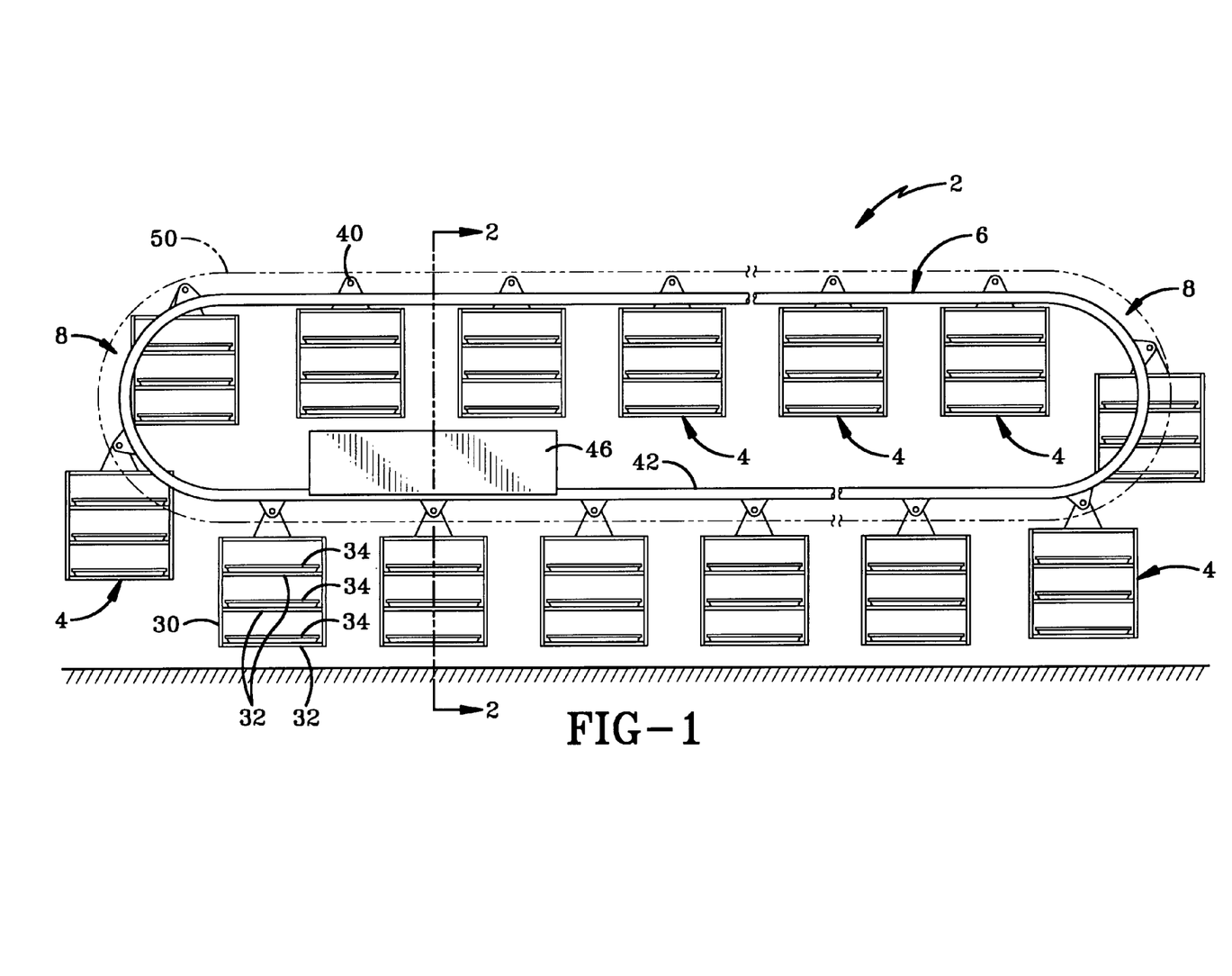
FIG. 1 is a front elevation view of a first embodiment of the tray accumulator of the invention shown in a first configuration with portions removed or shown schematically.

A first embodiment of the tray accumulator of the invention is indicated generally by the number 2 in the accompanying drawings. Tray accumulator 2 generally includes a plurality of tray-holding cages 4 that are suspended from a drive track 6. Drive track 6 follows a looped path having one transverse leg disposed higher than another leg. Each transverse leg may be horizontal as shown in the drawings. In other configurations, the transverse legs may slope up or down. The looped path may be described as an over-up-back or an over-down-back path. The looped path may also be described as a vertically disposed loop or as a loop with its transverse legs offset in a vertical direction. As shown below, the transverse legs may also be offset in a horizontal direction in addition to the vertical direction. In the first configuration, the path has two 180 degree turns 8 where the path moves from one transverse leg to another transverse leg. The path may also traverse horizontal corners to allow for a wide variety of path configurations. These paths allow accumulator 2 to double back over itself as shown in FIG. 1 in order to increase the capacity of the accumulator 2. These paths also allow accumulator 2 to operate continuously.

Figure 2:
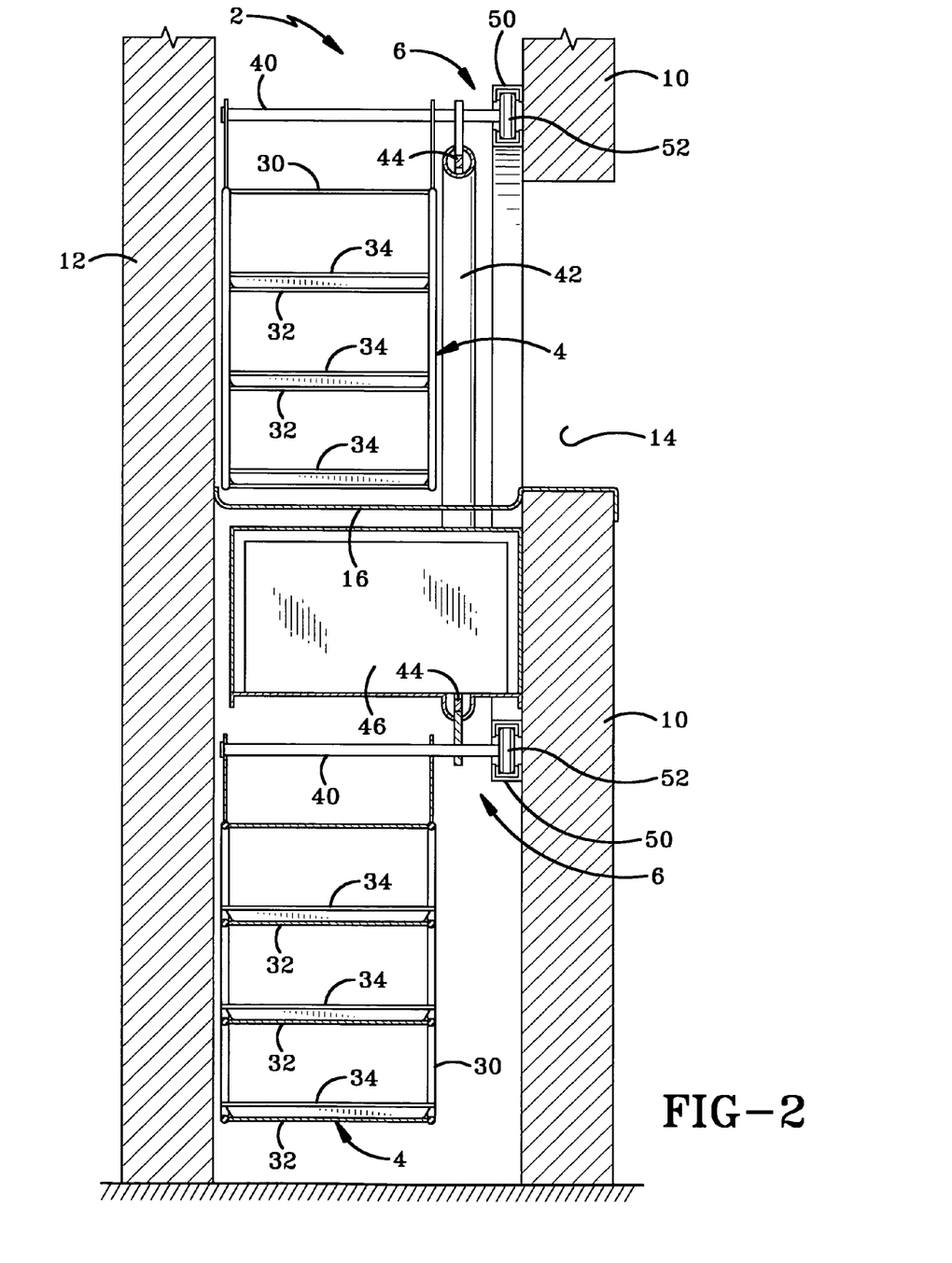
FIG. 2 is a section view taken along line 2—2 of FIG. 1.

FIG. 1 shows an exemplary accumulator 2 that may be retrofit into the same wall space as a prior art horizontal tray conveyor by using the space below the prior art horizontal conveyor to allow accumulator 2 to loop back under itself. FIG. 2 shows the relative heights of the transverse path legs and how accumulator 2 fits between existing walls 10 and 12. FIG. 2 shows the minimum width required between walls 10 and 12. Accumulator 2 may fit into a 20 inch space to allow for retrofitting. One typical tray accumulator arrangement in existing cafeterias has walls 10 and 12 spaced apart 20 inches. Retrofits must fit within this space as well as the available vertical space within walls 10 and 12.

Wall 10 defines a loading window 14 that permits the patrons to load their trays and dishes onto cages 4. A lower wall 16 is provided to catch dropped items or spills. Lower wall 16 is at least provided at window 14 but may be longer. At least one of walls 10 and 12 define an unloading window 18 (FIG. 3) where the staff removes the trays and dishes from cages 4 and runs them through the dishwashing process.

Each tray-holding cage 4 includes a frame 30 with a plurality of shelves 32 adapted to hold a tray 34. The drawings show an exemplary embodiment where each cage 4 has three shelves 32 spaced in height a distance sufficient to receive tray 34 and a tall drinking glass that has been stacked on a plate or bowl. Each shelf 32 may be provide with appropriate gripping mechanisms or guards to prevent trays 34 from falling off of shelves 32. The gripping mechanism may be a friction mat on the horizontal surface of each shelf 32. The guard may be a wall disposed around the perimeter of each shelf 32.

Each cage 4 is suspended from a support bar 40 that is cantilevered with respect to drive track 6. Support bar 40 may extend across the entire width of cage 4 as shown in FIG. 2 or may only extend to a location above the center of gravity for cage 4. Cages 4 may be fabricated from a variety of materials such as stainless steel, plastics, and other materials that are strong and stand up to repeated washings.

Each support bar 40 is driven by drive track 6 causing cages 4 to travel around the path of drive track 6. Each support bar 40 is cantilevered from drive track 40 such that each cage 4 is disposed in front of or behind drive track 6 so that cages 4 may be reversed at corners 8.

Drive track 6 may be in the form of a monorail track having a protective outer frame 42 with a driven drive chain 44 disposed inside the frame. One such monorail system is manufactured and sold by Bridgeveyor Overhead Systems Ltd of Markham, Ontario. Other types of systems may also be used for drive track 6. A drive unit 46 continuously drives chain 44 around the path at a selected and adjustable speed.

A counterbalance rail 50 may be provided to maintain the position of cages 4. The end of support bar 40 may be directly received in counterbalance rail 50. A wheel 52 may also be used to reduce friction between support bar 40 and rail 50. When counterbalance rail 50 is not used with drive track, cage 4 is counterbalanced directly against one of walls 10 and 12. The direct counterbalance may be a wheel or a direct frictional engagement. Counterbalance rail 50 is shown as being disposed adjacent track 6 for ease of installation. In other embodiments of the invention, rail 50 may be disposed on the other side of cage 4 or at the bottom of cage 4 depending on the type of installation. Counterbalance rail 50 also may be a passive rail system or a driven system that is synchronized with drive track 6.

Figure 3:
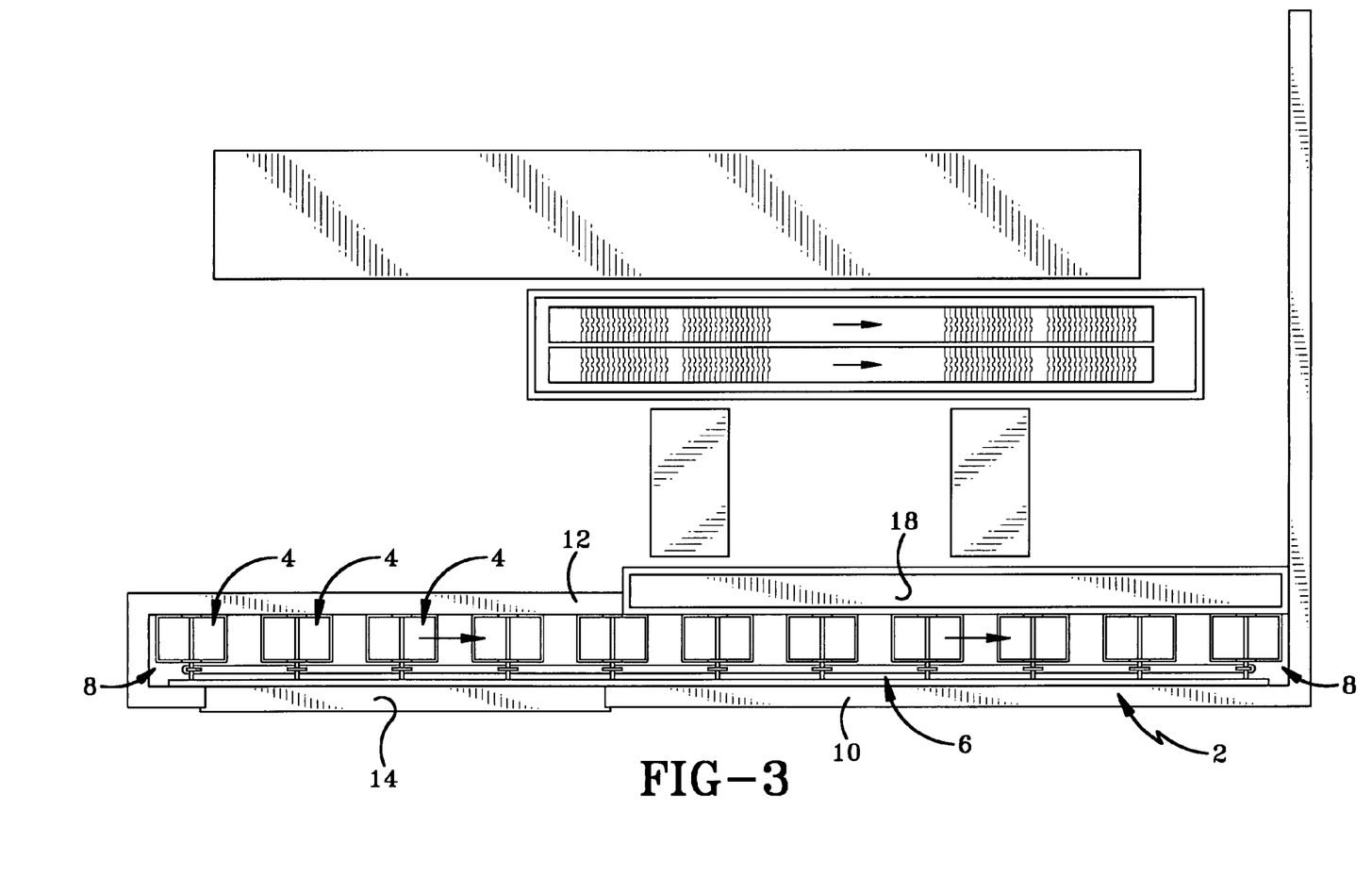
FIG. 3 is a top plan view of the first embodiment in the first configuration.
Figure 4:
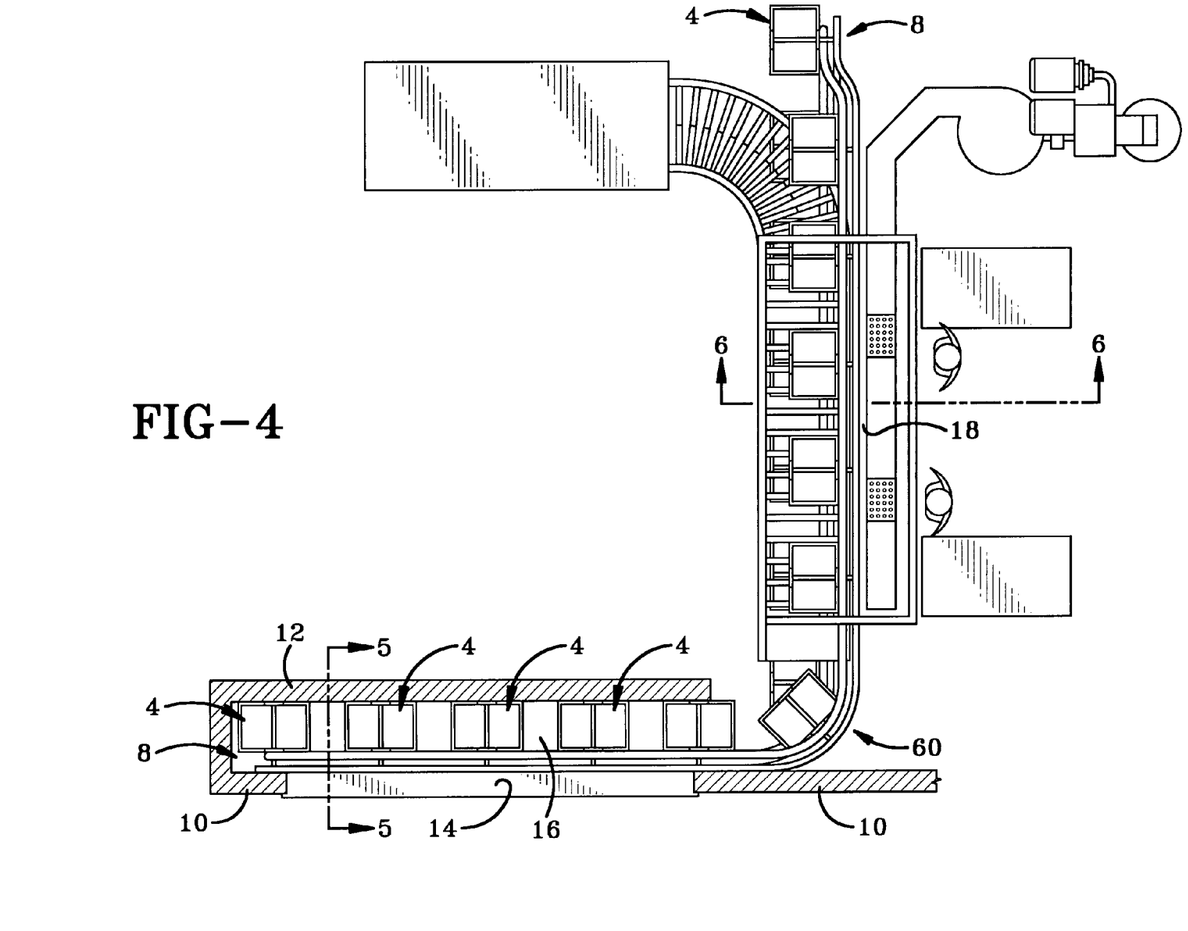
FIG. 4 is a top plan view of the first embodiment in a second configuration.
Figure 5:
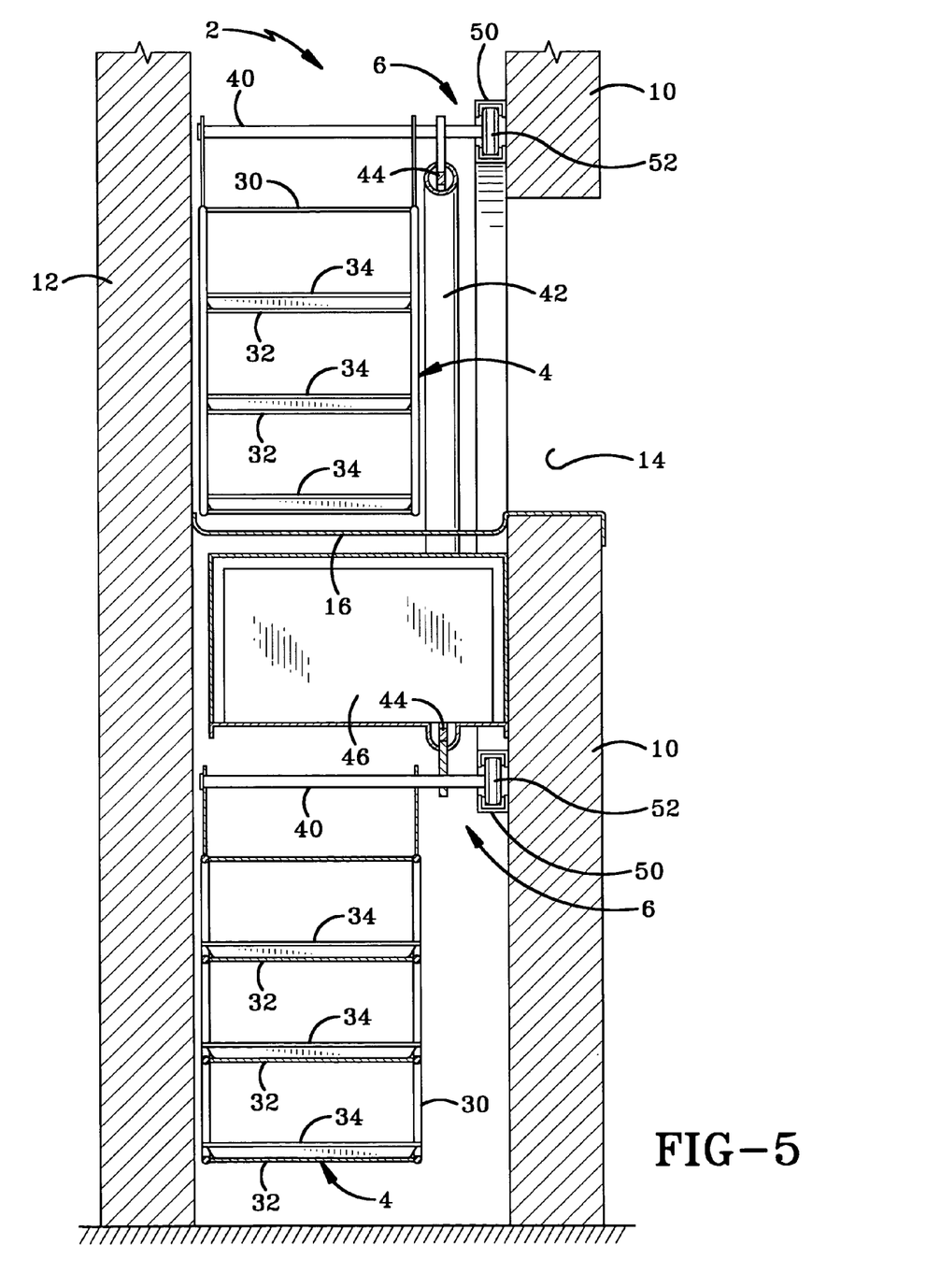
FIG. 5 is a section view taken along line 5—5 of FIG. 4.
Figure 6:
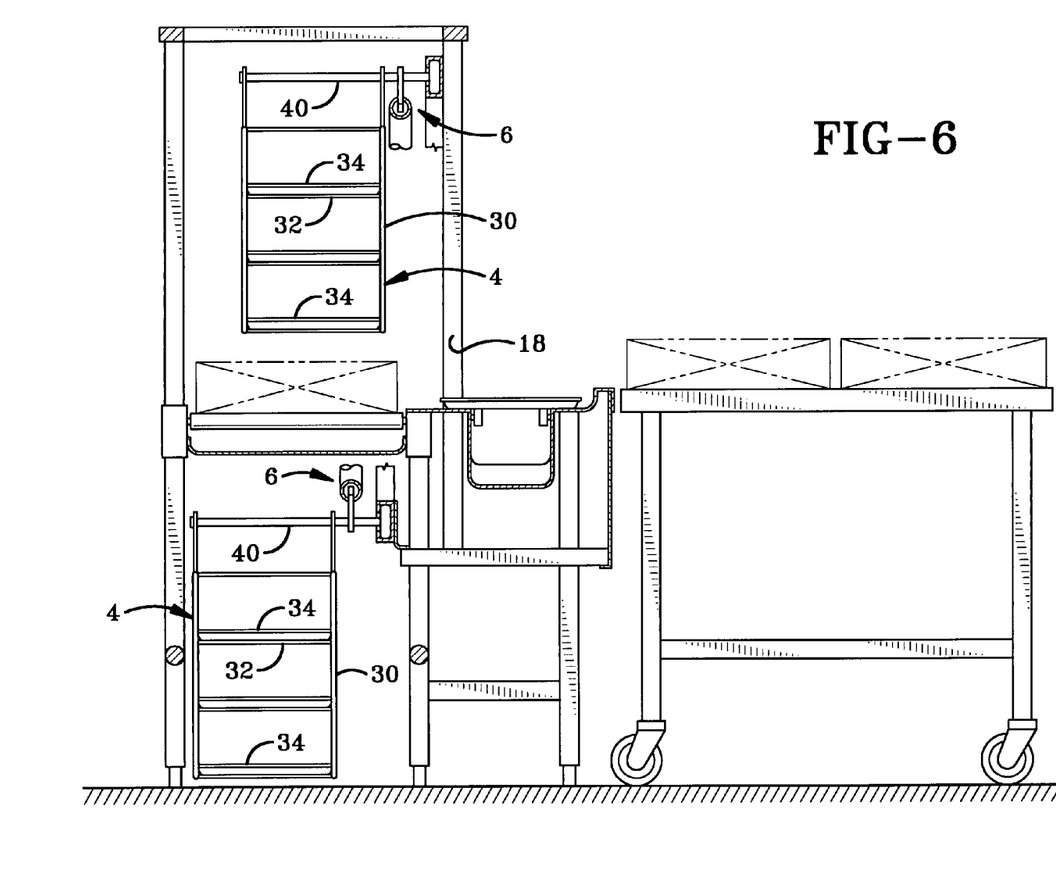
FIG. 6 is a section view taken along line 6—6 of FIG. 4.

FIG. 3 shows an example wherein the upper transverse leg of the path is directly above the lower transverse leg of the path. In FIG. 4, the upper and lower transverse legs are offset to allow cages 4 to be moved closer to unloading window 18 as shown in FIG. 6. The configuration of FIGS. 4–6 also show a track configuration that includes a pair of 180 degree vertical turns 8 as well as a horizontal right angle turn 60.

Figure 7:
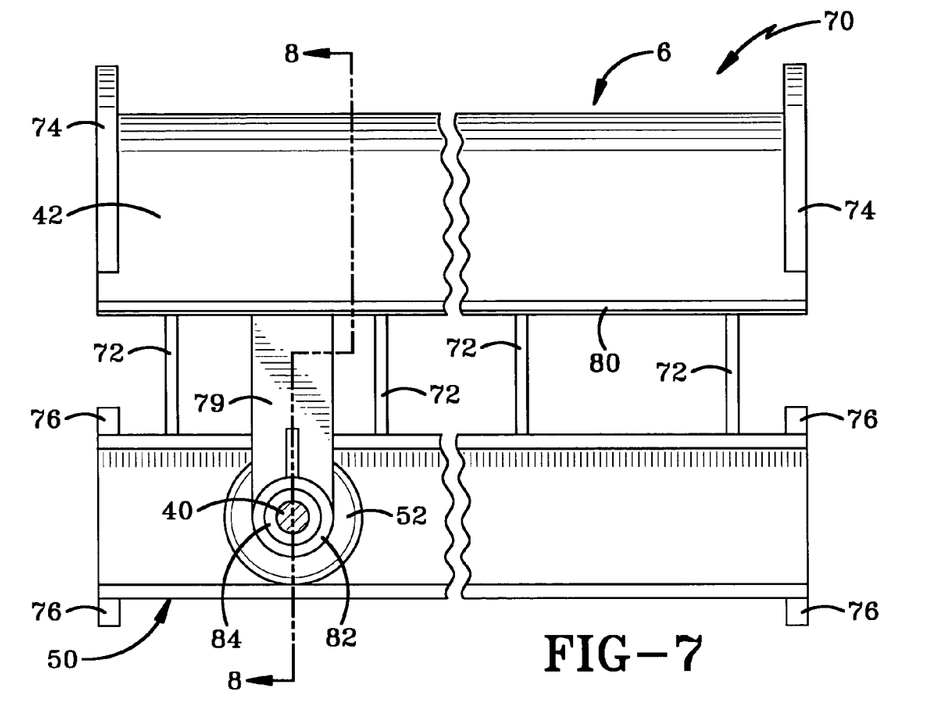
FIG. 7 is a side elevation view of a track section used to fabricate the drive track of the invention.
Figure 8:
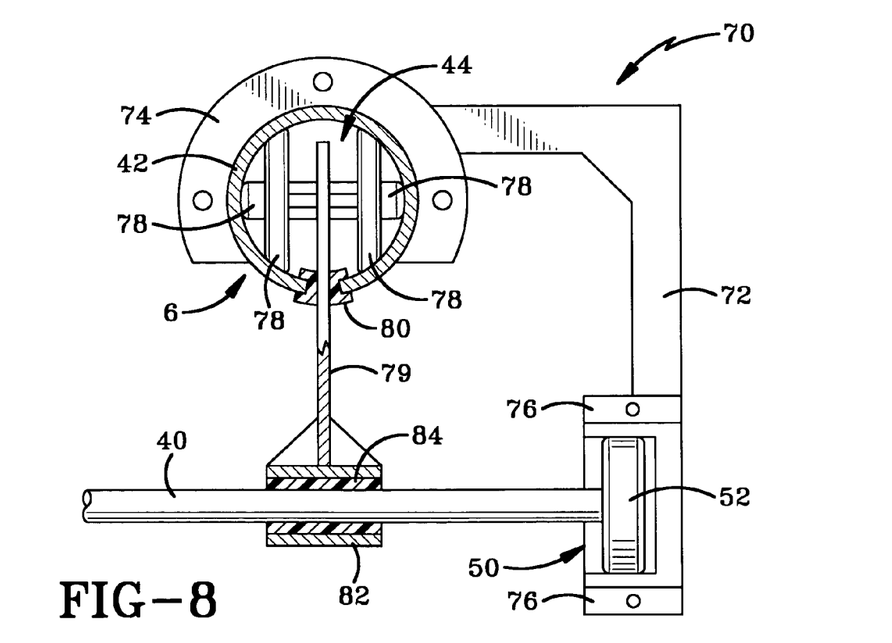
FIG. 8 is a section view taken along line 8—8 of FIG. 7.

FIGS. 7 and 8 show a more detailed version of a track and balance section 70 that is used to form drive track 6 and counterbalance rail 50. Each section 70 includes a section of drive track 6 and a section of counterbalance rail 50. Sections 70 may be provided in a variety of lengths and curves so that sections 70 may be used as building blocks that are connected together to form different paths. Connectors 72 are used to lock sections 6 and 50 together. Connectors 72 may be provided with openings that allow section 70 to be mounted to a wall or other support structure.

Track 6 includes flanges 74 that allow sections 70 to be bolted together. Rails 50 also includes flanges 76. Drive chain 44 may include a plurality of wheels 78 that engage the inner surface of outer frame 42. A hanger 79 projects out of a slot in outer frame 42. A gasket 80 may be provided at the slot to reduce rattling. A bushing housing 82 may be supported at the end of hanger 79. A bushing 84 may be used to support bar 40. (Note that bushing housing 82 and bushing 84 are drawn in section for clarity.)

Figure 9:
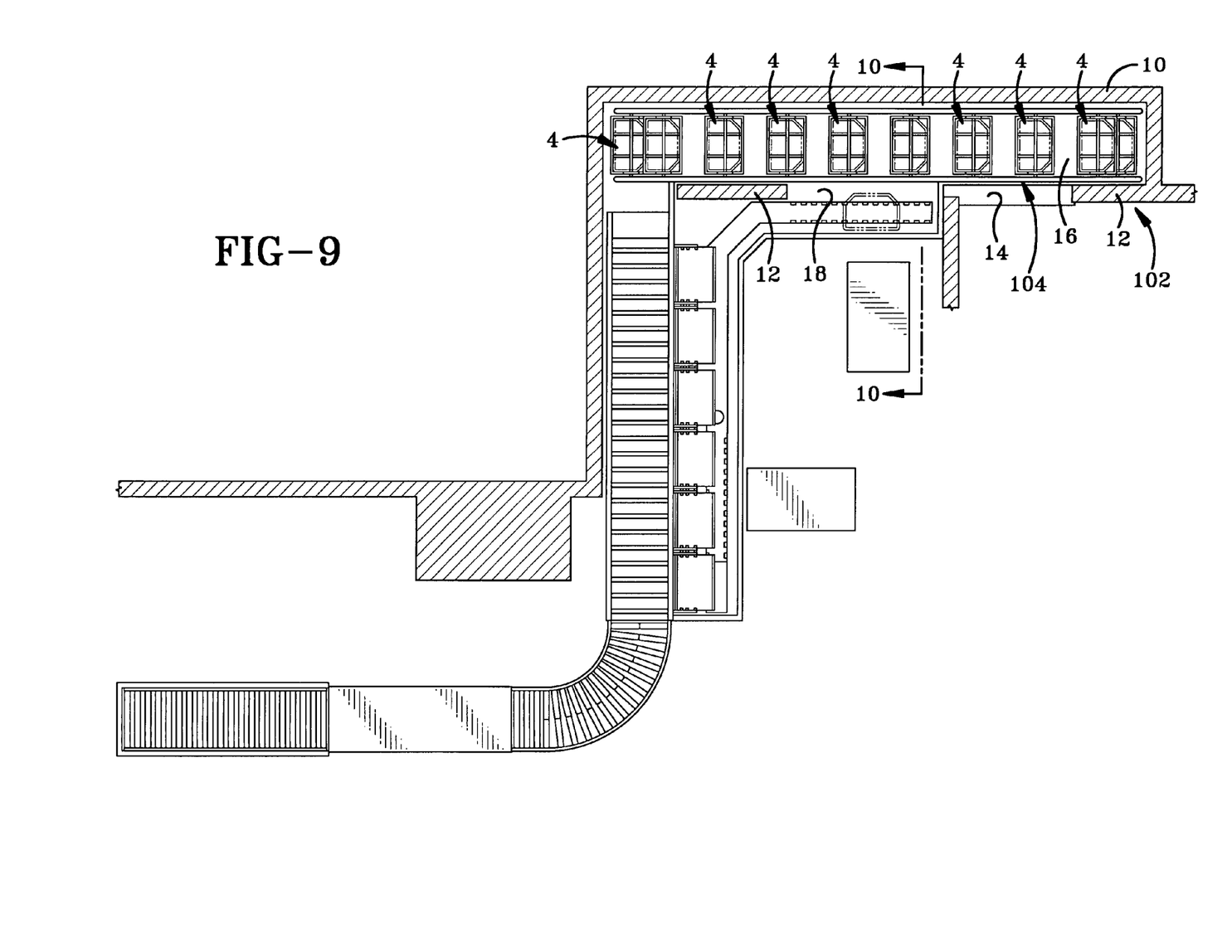
FIG. 9 is a top plan view of a second embodiment for the tray accumulator of the invention shown in a first configuration.
Figure 10:
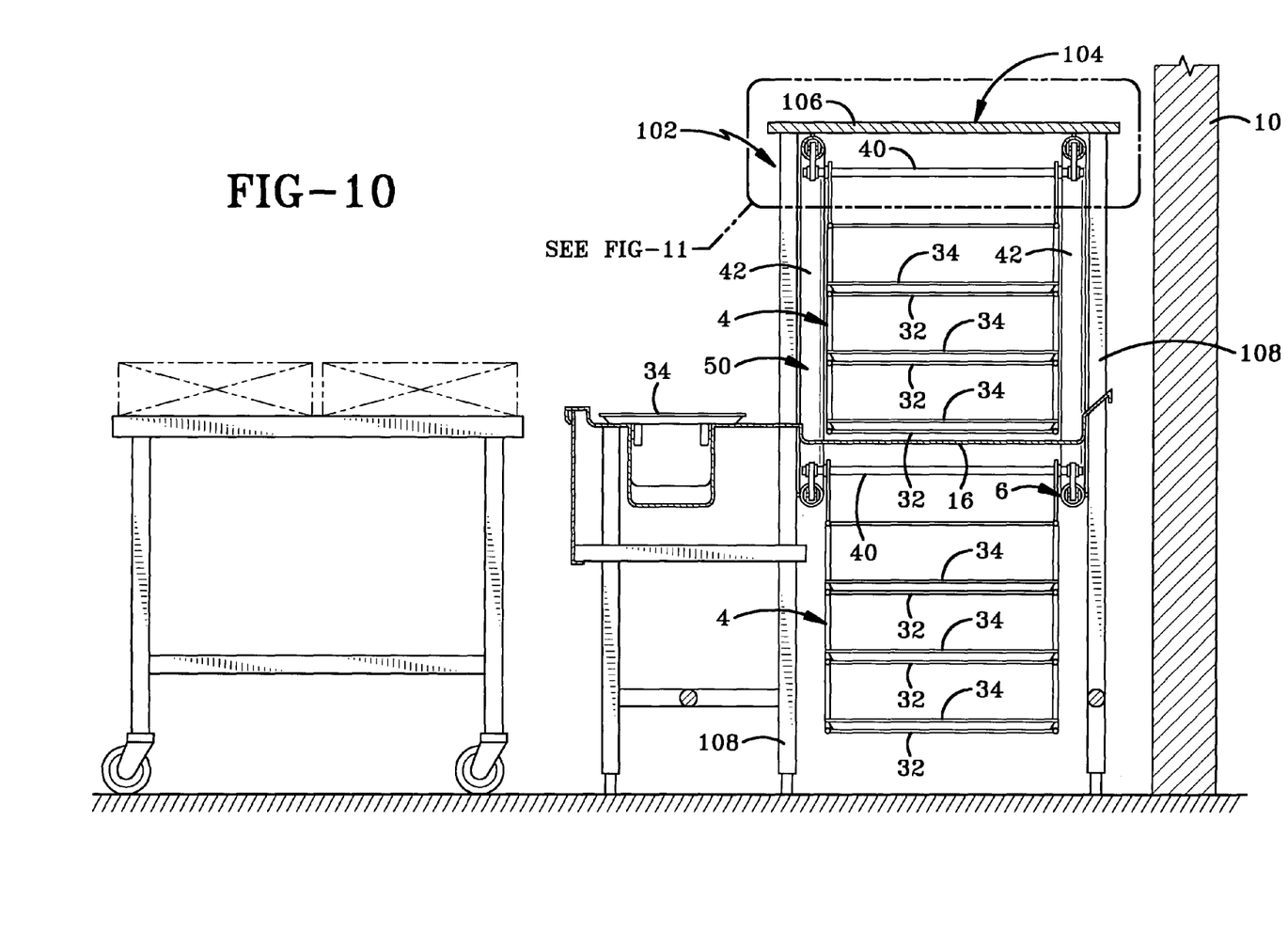
FIG. 10 is a section view taken along line 10—10 of FIG. 9.
Figure 11:
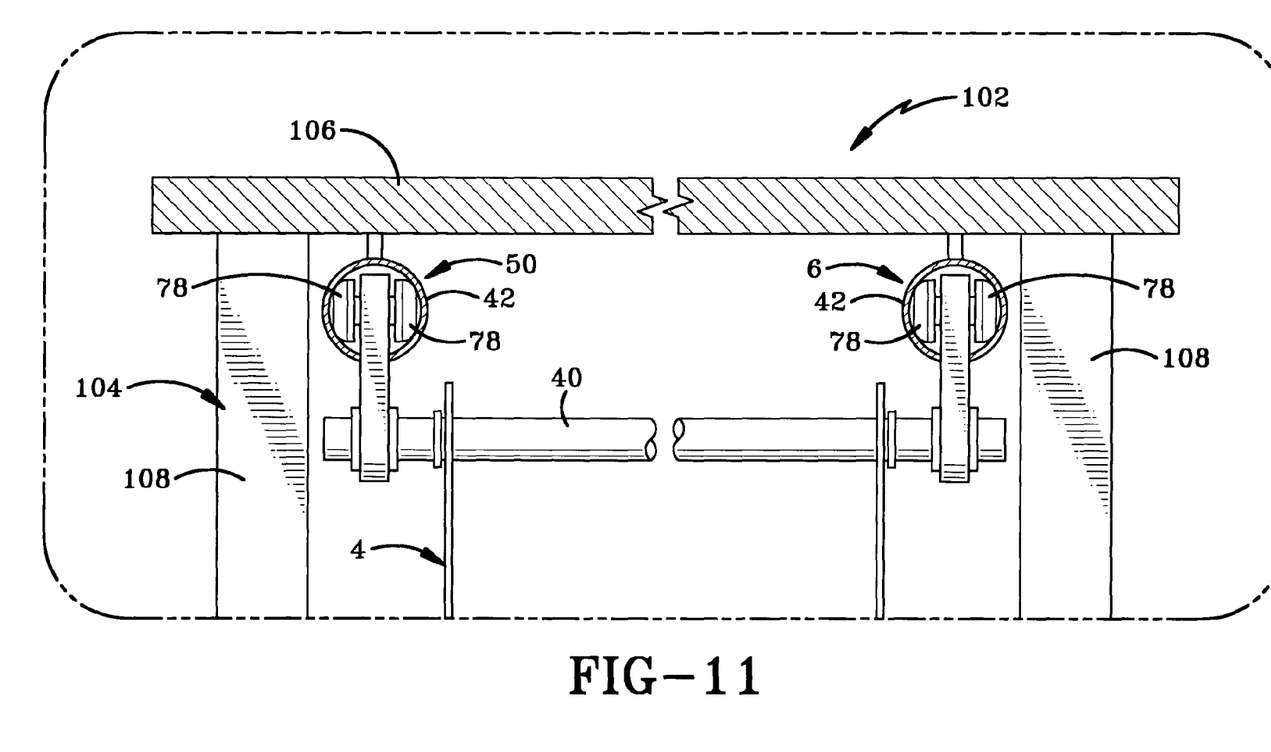
FIG. 11 is an enlarged view of the encircled portion of FIG. 10.

A second embodiment of the tray accumulator of the invention is indicated generally by the numeral 102 in FIGS. 9–11. Tray accumulator 102 uses may of the same elements as tray accumulator 2 described above and the same numbers are used to refer to these elements in FIGS. 9–11. In this embodiment, drive track 6, counterbalance rail 50, and cages 4 are carried by a frame 104 disposed adjacent wall 10. Frame 104 is a self-supporting structure that allows accumulator 102 to be retrofit into existing accumulator spaces with modifications to walls 10 and 12. Frame 104 includes a top deck 106 that covers accumulator 102 and provides rigidity to frame 104. A plurality of legs 108 provide height adjustments. Legs 108 and deck 106 are preferably fabricated from a washable material (aluminum or stainless steel).

Drive track 6 engages and is driven by drive unit 46 as described above. In this embodiment of the invention, counterbalance rail 50 uses the same structure as drive track 6 but without drive unit 46. Counterbalance rail 50 is disposed opposite drive track 6 and supports each cage 4 in the same manner as drive track 6. Each cage 4 is thus suspended from track 6 or rail 50 on both sides of cage 4 adjacent walls 10 and 12. This configuration stabilizes each cage 4 while allowing access through the loop of track 6 and rail 52 cages 4. If desired, counterbalance rail 50 may also be driven by a drive unit 46 that is synchronized with the drive unit of drive track 6.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. In combination, a building structure and a cafeteria tray accumulator system; the building structure including first and second spaced walls; the first and second spaced walls defining a space between the walls; the first and second walls defining loading and unloading windows; the loading window adapted to allow users to load cafeteria trays laden with dirty dishes into the accumulator system; the unloading window adapted to allow users to unload the cafeteria trays from the accumulator system into a dish wash room; the loading and unloading windows being offset from one another; the cafeteria tray accumulator system including: a drive track disposed in a looped path within the space between the walls; the looped path having a pair of transverse legs offset in a vertical direction; both transverse legs being disposed within the space between the walls: a plurality of tray-holding cages connected to the drive track; each of the tray-holding cages adapted to hold a plurality of cafeteria trays; and a drive unit adapted to move the plurality of cages around the looped path of the drive track.

2. The combination of claim 1, wherein the drive track is a monorail.

3. The combination of claim 2, further comprising a counterbalance rail.

4. The combination of claim 3, further comprising a support bar attached to the drive track for each tray-holding cage; the support engaging the counterbalance rail.

5. The combination of claim 4, wherein each tray-holding cage is suspended from the support bar.

6. The combination of claim 5, wherein each tray-holding cage is adapted to hold at least three trays.

7. The combination of claim 1, wherein the transverse legs of the looped path are offset in a horizontal direction.

8. The combination of claim 1, wherein the looped path turns around at least one right angle.

9. The combination of claim 8, wherein the right angle is vertical.

10. The combination of claim 1, wherein the drive track is disposed in a vertical plane.

11. In combination, a building structure and a cafeteria tray accumulator system; the building structure including a dining area and a dish washing area and first and second spaced walls; the first and second spaced walls defining a space between the walls; the first and second walls defining loading and unloading windows; the loading window disposed at the dining area and being adapted to allow users to load cafeteria trays into accumulator system; the unloading window disposed at the dish washing area and being adapted to allow users to unload the cafeteria trays from the accumulator system; the loading and unloading windows another; the cafeteria tray accumulator system including: a monorail drive track disposed in a looped path disposed within the space between the walls; the looped path having first and second traverse legs offset in a vertical direction; a plurality of tray-holding cages conned to the monorail; a counterbalance rail; each cage disposed intermediate the drive track and the counterbalance rail; each of the tray-holding cages engaging the counterbalance rail; each of the tray-holding cages adapted to hold a plurality of trays; and a drive unit adapted to move the plurality of cages around the looped path of the drive.

12. The combination of claim 11, wherein the looped path is disposed in a vertical plane.

13. The combination of claim 11, wherein the counterbalance rail is a monorail.

14. The combination of claim 13, wherein each of the monorails has a hollow tube section with rollers disposed inside the tube section.

15. The combination of claim 11, further comprising a self-supporting frame that carries the drive track and the counterbalance rail.

* * * * *